United States Patent [19]

Shaffer

[11] Patent Number: 5,418,303
[45] Date of Patent: May 23, 1995

[54] CARBOCATIONIC CATALYSTS AND PROCESS FOR USING SAID CATALYSTS

[75] Inventor: Timothy D. Shaffer, Dickinson, Tex.

[73] Assignee: Exxon Chemical Patents Inc., Linden, N.J.

[21] Appl. No.: 263,104

[22] Filed: Jun. 21, 1994

Related U.S. Application Data

[62] Division of Ser. No. 116,422, Sep. 3, 1993, Pat. No. 5,350,726.

[51] Int. Cl.$^6$ .............................. C08F 4/44
[52] U.S. Cl. ........................ 526/93; 526/135; 526/147; 526/91; 526/192; 526/195; 526/226; 526/172; 526/204; 526/206; 526/217
[58] Field of Search ............... 526/91, 93, 135, 147, 526/192, 195, 226, 172

[56] References Cited

U.S. PATENT DOCUMENTS

| 4,611,037 | 9/1986 | Musch et al. | 526/135 |
| 5,169,914 | 12/1992 | Kaszas et al. | 526/135 |
| 5,194,538 | 3/1993 | Puskas et al. | 526/206 |
| 5,342,908 | 8/1994 | Osman | 526/135 |

*Primary Examiner*—Mark Nagumo
*Attorney, Agent, or Firm*—Catherine L. Bell

[57] ABSTRACT

A carbocationic catalyst composition comprising an initiator of water, a tertiary alkyl or aralkyl halide, ester, ether, carboxylic acid, acid halide or a polymeric halide and a co-initiator of an alkoxy metal halide, is used to produce narrow molecular weight distribution olefin polymers particularly isobutylene/para-methylstyrene copolymers.

16 Claims, No Drawings

CARBOCATIONIC CATALYSTS AND PROCESS FOR USING SAID CATALYSTS

This is a division of application Ser. No. 08/116,422, filed Sep. 3,1993, now U.S. Pat. No. 5,350,726.

FIELD OF THE INVENTION

This invention relates to the polymerization of olefins using catalysts comprising alkoxy metal halides and water, tertiary alkyl halides, esters, ethers, acid halides or carboxylic acids.

BACKGROUND OF THE INVENTION

Copolymerizations of isobutylene with styrenics and dienes are known for a variety of temperature, solvent initiation and Lewis acid combinations. Initiation may be carried out from water or alkyl halide initiators. Many examples exist in the literature where water is known to be the source of initiation. One well known example is the $BF_3 \cdot H_2O$ catalyst. Other Lewis acids have also been used including Titanium tetrachloride ($TiCl_4$), aluminum trichloride ($AlCl_3$), aluminum tribromide ($AlBr_3$), tin tetrachloride($SnCl_4$), iron trichloride ($FeCl_3$), and alkylaluminum halides ($R_n AlX_{3-n}$; n=0, 1 or 2). Examples of other co-initiators are found with similar frequency. From this wealth of data it can be concluded that molecular weights and yields of copolymers, like that of homopolymers, fall off upon increasing the polymerization temperature and reducing the polarity of the solvent. One of the best systems for preserving both yield and molecular weight at higher polymerization temperatures is that based on aluminum halides. Even though aluminum halide catalysts can be used in nonpolar solvents, the ability of the halide alone to cause initiation of isobutylene in addition to initiation from water or other added initiation sources creates a system which can generate copolymers of reasonably broad molecular weight distribution, i.e. $Mw/Mn \geq 4$, especially with styrenic comonomers. Supported alkoxyaluminum halides have been used for the homopolymerization of isobutylene to molecular weights higher than those from other catalysts at similar temperatures (see T. C. Cheng, et al., in POLYMER BULLETIN 28, 123, 1992).

For an industrially applicable process these above catalysts and polymerization conditions fall short of commercial usefulness. Improvements in these systems would include elimination of boron and titanium based Lewis acids as they present handling and purification problems. Also a reduction in the amount of catalyst used would be desirable and a reduction in polymerization time would be desirable.

Polymerization processes that avoid the use of halogenated solvents are desirable from many perspectives. However, this restriction eliminates many Lewis acid systems from consideration because of their poor polymerization capabilities in nonpolar solvents. Alkyl aluminum halides can be used with non-polar solvents, but can lead to problems with MWD control and hence property control. An attractive system would be capable of providing copolymers of reasonably high molecular weight with good polydispersity control from a nonpolar polymerization solvent or a solvent system which minimized the amount of polar component required.

SUMMARY OF THE INVENTION

In accordance with this invention, there is provided a carbocationic polymerization catalyst system comprising (1) an initiator comprising one of water, a tertiary alkyl halide, a tertiary aralkyl halide, a tertiary alkyl ester, a tertiary aralkyl ester, a tertiary alkyl ether, a tertiary aralkyl ether, a tertiary alkyl carboxylic acid, a tertiary aralkyl carboxylic acid, a tertiary alkyl acid halide or a tertiary aralkyl acid halide, wherein each alkyl is independently a linear, branched or cyclic chain alkyl and each aralkyl may be substituted or unsubstituted; and (2) a co-initiator of alkoxy metal halide. Another aspect of the invention comprises a process of using this catalyst system for the polymerization and copolymerization of olefins.

DESCRIPTION OF PREFERRED EMBODIMENTS

This invention relates to a carbocationic polymerization catalyst composition and polymerization process based upon a catalyst composition comprising: (1) an initiator comprising one of water, a tertiary alkyl halide, a tertiary aralkyl halide, a tertiary alkyl ester, a tertiary aralkyl ester, a tertiary alkyl ether, a tertiary aralkyl ether, a tertiary alkyl carboxylic acid, a tertiary aralkyl carboxylic acid, a tertiary alkyl acid halide, or a tertiary aralkyl acid halide, wherein each alkyl is independently a linear, branched or cyclic chain alkyl preferably having 1 to 15 carbon atoms and each aralkyl may be substituted or unsubstituted; and (2) an alkoxy metal halide, preferably an alkoxy aluminum halide. This catalyst system can be used, among other things, for the copolymerization of olefins, particularly iso-olefins and styrenics. In a preferred embodiment, the system has the benefit of producing polymers with high molecular weight and statistical molecular weight distributions at temperatures higher than previously used in similar polymerizations. This system also obtains the benefit of utilizing water as a preferred initiator.

Preferred organic initiators include tertiary compounds represented by the formula below:

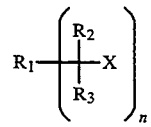

wherein X is a halogen, psuedohalogen, alcohol, ether, ester, carboxylic acid or acid halide group or a mixture thereof, preferably chloride and $R_1$, $R_2$ and $R_3$ are independently any linear, cyclic or branched chain alkyls, aryls or aralkyls, preferably containing 1 to 15 carbon atoms, more preferably 1 to 8 carbon atoms, even more preferably 1 to 2 carbon atoms. n is the number of initiator sites and is a number greater than or equal to 1, preferably n is a number from 1 to 6. The aralkyls may be substituted or unsubstituted. Preferred examples of initiators include 2-chloro-2,4,4-trimethyl pentane (TMPCl), 2-phenyl-2-propanol, 5-tert-butyl-1,3-di(1-chloro-1-methyl ethyl) benzene (TBDCC). Other suitable initiators can be found in U.S. Pat. No. 4,946,899, which is herein incorporated by reference.) The formula above specifically includes single compounds having more than one initiation site thereon, such as 1,3,5 tri (1-chloro-1-methyl ethyl) benzene. For the purposes of this invention and any claims thereto, aralkyl is defined to mean a compound containing both aromatic and aliphatic structures. For the purposes of this invention and the claims thereto psuedohalogen is defined to be any compound that is an azide, an isocyanate, a thiocyanate, an isothiocyanate or a cyanide.

The alkoxy metal halide is a Lewis acid and is preferably a compound containing one or more alkoxy groups having 1 to 30 carbon atoms, one or more electrophilic metals and one or more halogens or psuedohalogens. The "alkyl"(s) of the alkoxy group may be (independently) any radical of substituted or unsubstituted aliphatic or cyclic hydrocarbon radical including linear, cyclic or branched paraffins, olefins, acetylenes, cyclo paraffins, cycloolefins, cycloacetylenes, cyclic or acyclic terpenes, or heterocyclics.

Preferred examples of aliphatic hydrocarbon radicals include: pentyl, butyl, isobutyl, hexyl, 3,5,5,tri-methyl hexenyl. Preferred examples of cyclic hydrocarbons include: cyclohexyl, cyclopentyl, cyclopentadienyl, cyclopentaenyl and the like. Especially preferred alkoxy metal halides include those classes where the alkyl is a straight, linear, or cyclic $C_1$ to $C_{30}$ alkyl, more preferably having 1 to 15 carbon atoms even more preferably having 4 to 8 carbon atoms. Non-limiting examples of alkoxy metal halides include methoxyaluminum dichloride, pentoxyboron dichloride, dodecoxyaluminum dichloride and the like. Brominated versions of the above are also within the scope of this invention.

The metal is preferably an electrophilic metal, even more preferably aluminum or boron, even more preferably aluminum. The halogen may be any halogen or pseudohalogen and is preferably chlorine or bromine, even more preferably chlorine. It is specifically contemplated by this invention that the alkoxy metal halide may have one or more halogen groups. Preferred examples of alkoxy metal halides include alkoxy aluminum bromides, such as butoxyaluminum dibromide, pentoxyaluminum dibromide, isobutyloxyaluminum dibromide, etc. and alkoxyaluminum chlorides, particularly pentoxyaluminum dichloride (POAC), butoxyaluminum dichloride, and the like.

Preferred alkoxy metal halides include those represented by the formula:

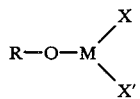

wherein X and X' are independently any halogen or psuedo halogen, preferably chlorine or bromine, M is any electrophilic metal, preferably selected from the group consisting of aluminum, boron, gallium, vanadium, chromium, manganese, iron, cobalt, nickel, copper, zinc, tin and indium, preferably aluminum or boron and R is any linear or branched aliphatic or any cyclic hydrocarbon radical, preferably having 1 to 15 carbon atoms, even more preferably 1 to 8 carbon atoms.

Preferred monomers that may be copolymerized by this system include olefins having 4 or more carbon atoms. Preferred olefins include geminally disubstituted olefins, disubstituted olefins, isoolefins and substituted or unsubstituted styrenics. The styrenic may be substituted with an alkyl, aryl, halide or alkoxide group. Preferred styrenics include those substituted with an alkyl group, even more preferably substituted with an alkyl group having 1 to 15 carbon atoms, even more preferably 1 to 4 carbon atoms. Halogenated versions of the above styrene monomer are also preferred. In another preferred embodiment the styrenic is a para-alkyl styrene or para-halo styrene, wherein the alkyl has 1 to 15 carbon atoms, preferably 1 to 4 carbon atoms and the halogen is preferably chlorine or bromine. A preferred styrenic is para-methyl styrene. In a preferred embodiment the isoolefin is polymerized with an alkyl styrene, preferably isobutylene and para-alkyl styrene. Even more preferably isobutylene and para-methylstyrene.

The monomers may be present in the feed and the polymerization vessel in ratios of about 99.9 mole % isoolefin to about 0.1 mole % styrenic to about 0.1 mole % isoolefin to about 99.9 mole % styrenic depending on the desired properties in the final polymer. Preferred ratios include 5 to 49 mole % styrenics, even more preferably 5 to 10 mole % styrenics.

The copolymerization may take place in any reaction vessel known to those of skill in the art, including test tubes and bench reactors, solution phase reactors, pressure vessels, as well as commercial tubular and continuous stirred tank reactors. The copolymerization may take place in a bulk or solution system. If a bulk system is chosen, neat isobutylene is a preferred monomer. If a solvent system is chosen the solvent medium may be polar or nonpolar, with non-polar being preferred. The solvent media may also be a mixture of two or more solvents. Non-polar/non-polar, polar/polar and non-polar/polar mixtures and the like are all suitable for use in accordance with this invention.

Suitable solvents include hydrocarbons, especially hexanes, heptanes and toluene, halogenated hydrocarbons, especially chlorinated hydrocarbons, nitroalkanes, and the like. Specific examples include but are not limited to methyl cyclohexane, ethyl cyclohexane, propyl cyclohexane, methyl chloride, methylene chloride, ethyl chloride, propyl chloride, butyl chloride, chloroform, butyl chloride, pentyl chloride, hexyl chloride, chlorobenzene and brominated versions thereof as well, nitromethane, nitroethane, nitropropane and the like.

When selecting a solvent or solvent system, one must bear in mind that the reactivity ratios of the selected monomers and desired final product may influence solvent choice. For example, isobutylene and chlorostyrene are known to have reactivity ratios at about 1:1 in non-polar solvents. Thus, the polymer produced in a non-polar solvent would be expected to be a random copolymer of isobutylene and chlorostyrene. On the other hand, isobutylene and para-methyl styrene do not have reactivity ratios of 1:1 until a relatively polar solvent environment is present.

The alkoxy metal halide is preferably present in the polymerization reactor or feed at a mol ratio of up to about 200 times the moles of the initiator present, preferably about 0.05 to about 8, even more preferably about 1 to about 4. A preferred ratio is when alkoxymetal halide is present at 1 to 4 times the molar amount of water present. When water is not used as the initiator a proton scavenger or a primary or secondary amine may be present in the reaction. When organic initiators are used a proton scavenger or an amine is preferably used to mitigate the initiating influence of water. However one should also keep in mind that the amine may affect the amount of Lewis acid required for polymerization. One should also note that while all currently known proton scavengers are amines, not all amines are proton scavengers.

When choosing a particular initiator, one may consider that as a general rule one or two functional groups (X in the above formula) on the initiator will lead to a linear polymer product, while three or more functional groups lead to a star polymer.

The water present in the polymerization or catalyst system as described above is typically residual water found in solvents and the like, even after drying procedures used in the art. The water is typically present at a concentration at about $10^{-1}$ moles per liter to about $10^{-6}$ moles per liter, preferably about $10^{-2}$ moles per liter to about $10^{-5}$ moles per liter, even more preferably about $10^{-2}$ moles per liter to about $10^{-4}$ moles per liter.

An optional component of the catalyst system using water as an initiator is a secondary or tertiary amine. The amine can be any secondary or tertiary amine but is preferably one represented by the following formula:

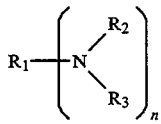

Wherein $R_1$, $R_2$, and $R_3$ are each independently hydrogen or a straight, cyclic or branched chain alkyl aryl or aralkyl, preferably containing one to fifteen carbon atoms, even more preferably one to eight carbon atoms, even more preferably one to four carbon atoms, and n is an integer provided that only one of $R_1$, $R_2$ or $R_3$ can be H at any one time and that $R_2$ and $R_3$ may or may not be joined in a cyclic structure. The aralkyls can be substituted or unsubstituted. An aralkyl is a compound containing both aromatic and aliphatic structures.

Preferred examples of amines include, diisopropylamine, triethylamine, tributylamine, diiosbutylamine, diethylamine, 2,6-di-tert-butylpyridine and the like. The amine is typically present at a concentration that is less than the total water concentration in the system.

The concentration of the water in a system producing polymer with a molecular weight distribution ($M_w/M_n$) less than about 1.5 is calculated by solving for I in the following equation [M]/[I]=DP, where M equals monomer, I equals initiator and DP equals the degree of polymerization for a water initiated polymerization. Degree of polymerization is calculated by dividing the number average molecular weight of the polymer by the weight average molecular weight of the monomer(s). (For example, 0.268 mol/l of $TiCl_4$ and 2.8 mol/l of isobutylene in a 60/40 mix of methylcyclohexane/methylene chloride at −75 degrees C. for 21 minutes yielding 89% polymer with a Mn of 69,100 and an Mw/Mn of 1.32 means DP=1232 and the water concentration=2.8/DP; therefore [I]=2.3×$10^{-3}$ mol/l). This value is calculated for a batch of dried solvent or solvent mixture and then the value is used when that solvent is the reaction media. For the purposes of this invention it is assumed that the concentration of water in a given system of the same solvent batch does not vary in a statistically significant manner. Even though the exact concentration may vary the concentration is usually between $10^{-3}$a to $10^{-4}$M. For purposes of this invention, it is assumed that the water is free or available to act with the Lewis acid.

It is assumed that one mole of amine deactivates one mole of Lewis acid. Lewis acid present in excess of the amine is considered active and influences the polymerization rate in a manner akin to that where no amine is present. Similar deactivation of the Lewis acid by the proton trap is greatly minimized and may even not be considered when a polar solvent is used. Thus, for purposes of this invention "active co-initiator" is defined to be that co-initiator present in excess of an amine in the catalyst system.

Another optional component in non-water initiated polymerization is a proton scavenger. For the purposes of this invention and the claims thereto a proton scavenger is defined to be a composition capable of reacting with free protons and not producing a new species of catalyst or if it does produce a new species of catalyst, that catalyst is substantially inactive when compared to the catalyst system of this invention. Preferred proton scavengers are 2,6-di-tert-butylpyridine (DTBP), 4-methyl-2,6-di-tert-butylpyridine, 1,8-bis(dimethylamino)-naphthalene or diisopropylethylamine used alone or in combination. It has been found that the presence of a proton scavenger enhances polymerization by acting with residual water to prevent or significantly minimize water initiated chains. Thus any co-initiator Lewis acid in the catalyst system is preferably present in excess of the free proton scavenger not acting on the residual water.

The polymerization reaction may be run at or below about 20 degrees C., preferably below about 0 degrees C., even more preferably below about −10 degrees C. Temperatures above 20 degrees C. are not necessarily preferred, however they are within the scope of this invention. Preferred polymerizations of this invention also achieve significant conversion of monomer to polymer and high number average molecular weight. In a preferred embodiment, the polymerizations of this invention obtain conversions of at least about 40%, preferably at least about 50%, even more preferably of at least about 75%.

The polymerization is typically performed in a solution phase reactor or a pressure vessel by methods known in the art. The copolymerization is typically complete in about 10 minutes, however, may run from less than one minute to over two hours. However, longer polymerization times are still within the scope of this invention. Preferred times are between about 1 and about 30 minutes, preferably between about 1 and about 15 minutes.

The polymer products may have a Mn of 20,000 or more, preferably 50,000 or more, even more preferably 100,000 or more. Polyisobutylene and other isobutylene based polymers such as copolymers of isobutylene and para-methyl-styrene and copolymers of isobutylene and parachloro-styrene and copolymers of isobutylene and styrene having a high molecular weight are preferred polymers produced by this catalyst system at high conversion rates.

The following examples illustrate embodiments of the invention and are not intended to limit the scope of the invention.

EXAMPLES

Molecular weight (Mw and Mn) were measured by Gel Permeation Chromotography using a Waters 150 gel permeation chromatograph equipped with a differential refractive index (DRI) detector. The numerical analyses were performed using the commercially available standard Gel Permeation chromotography software package.

Composition of copolymers were determined by running proton-NMR in CDCl$_3$ on a 250 MHz NMR Spectrometer. Compositions were then determined by comparing the integration from the different repeating units and calculating mol % comonomer from derived algebraic equations whose derivation is straight-forward. An example of this technique is given for a copolymer of isobutylene with p-methylstyrene.

Integration was recorded for the CH$_3$-styrene protons between 2.1 and 2.4 ppm (A) (referenced to tetramethyl silane, a commonly used reference) and the integration of resonances between 0.87 and 1.7 ppm (B) due to the —CHCH$_2$— repeating unit of styrene and the —CH$_2$—C(CH$_3$)$_2$— repeating unit of isobutylene. These values were then used to solve the equation below:

$$\text{Mol \% comonomer} = \left(\frac{8A}{3B + 5A}\right)100$$

Example 1

Polymerizations were carried out in solvents dried by techniques used in the art. Methylcyclohexane (MCH), for example, was refluxed over concentrated sulfuric acid to remove olefins. Once cleaned up and pre-dried, it was further dried by distillation from sodium and benzophenone. Monomers were dissolved together in MCH at −20 degrees C. before adding the catalyst with stirring. Polymerizations were run for an average length of 10 minutes and were quenched by methanol addition. Polymer was isolated by precipitation into methanol. The basic recipe for the polymerization included 10 ml of MCH, 10 ml of isobutylene and $6.6 \times 10^{-3}$ moles of the comonomer (5 mole %). Lewis acid co-initiator (pentoxyaluminum dichloride-POAC) was added in the desired amounts by adding a calculated volume of a cooled 1.6M MCH stock solution of the Lewis acid. The following isobutylene polymerizations were with C$_5$OAlCl$_2$ (pentoxy aluminum dichloride) in 50% by volume methylcyclohexane, using water present at $2.3 \times 10^{-3}$ mol/L as an initiator at −20 degrees C. Results and conditions are shown in Table 1:

TABLE 1

| RXN | [C$_5$OAlCl$_2$] (mol/l) | [DTBP] (mol/l) | Yield (%) | Mn | Mw/Mn |
|---|---|---|---|---|---|
| 1 | 0.1 | 0.045 | 1 | 324,000 | 2.0 |
| 2 | 0.1 | — | 87 | 46,100 | 3.27 |
| 3 | 0.025 | 0.045 | <5 | ND | ND |
| 4 | 0.025 | — | 85 | 36,300 | 3.63 |
| 5 | 0.0125 | 0.045 | <5 | ND | ND |
| 6 | 0.0125 | — | 69 | 41,100 | 2.49 |
| 7 | 0.0063 | 0.045 | <5 | ND | ND |
| 8 | 0.0063 | — | 74 | 44,500 | 2.48 |

DTBP = 2,6-di-tert-butylpyridine
ND = Data not available

Example 2

The procedure of example 1 was followed and 5 Mole % of comonomer was present in the monomer feed. The conditions and results are presented in table 2

TABLE 2

| RXN | Comonomer | Yield (%) | Mol % in Polymer | Mn | Mw/Mn |
|---|---|---|---|---|---|
| 9 | isoprene | 12 | 4 | 16,100 | 2.52 |
| 10 | p-Me-styrene | 61 | 8 | 40,700 | 2.62 |
| 11 | 2,4-dimethyl pentadiene | 4 | — | — | — |
| 12 | Beta-Pinene | 1 | — | — | — |

[POAC] = 0.0125 mol/l

Example 3 (Comparison with Ethyl Aluminum Dichloride)

The procedure of example 1 was used except, 0.0125 mol/l of EtAlCl$_2$ were used in place of POAC. The conditions and results are in table 3.

TABLE 3

| RXN | Comonomer | Yield (%) | Mol % in Polymer | Mn | Mw/Mn |
|---|---|---|---|---|---|
| 13 | isoprene | 27 | — | 13,000 | 2.27 |
| 14 | isoprene | 7 | 3.0 | 15,000 | 2.79 |
| 15 | p-Me-styrene | 66 | 8.8 | 20,300 | 5.17 |
| 16 | 2,4-dimethyl pentadiene | 57 | 1.1 | 11,400 | 4.62 |
| 17 | Beta-pinene | 12 | — | 4,500 | 3.49 |
| 18 | Beta-pinene | 5 | 32 | 4,300 | 2.81 |

As is apparent from the foregoing general description and the specific embodiments, while forms of the invention have been illustrated and described, various modifications can be made without departing from the spirit and scope of the invention. Accordingly, it is not intended that the invention be limited thereby.

I claim:

1. A process for producing a polymer comprising contacting under polymerization conditions one or more olefinic, iso-olefinic, di-substituted olefinic or styrenic monomers with a catalyst composition comprising:
   an initiator comprising one of water, a tertiary alkyl or aralkyl halide, a tertiary alkyl or aralkyl ester, a tertiary alkyl or aralkyl ether, a tertiary alkyl or aralkyl carboxylic acid, or a tertiary alkyl or aralkyl acid halide, wherein each alkyl is independently a linear, branched or cyclic chain alkyl and each aralkyl may be substituted or unsubstituted; and
   a co-initiator of alkoxy metal halide or alkoxy metal pseudohalide, wherein each alkyl of the alkoxy is independently a straight or branched chain C$_1$ to C$_{15}$ alkyl and the metal is selected from the group consisting of aluminum, boron, gallium, vanadium, chromium, manganese, iron, cobalt, nickel, copper, zinc, tin, indium.

2. The process of claim 1 wherein the polymerization is conducted at a temperature at or below about 0 degrees C.

3. The process of claim 1 wherein the polymerization is conducted at a temperature at or below about −30 degrees C.

4. The process of claim 1 wherein the ratio of the number of moles of active co-initiator to the number of initiator sites is between about 0.001:1 to about 8:1.

5. The process of claim 1 wherein the catalyst composition further comprises proton scavenger.

6. The process of claim 5 wherein the co-initiator is an alkoxy aluminum halide, the initiator is a tertiary alkyl halide or tertiary aralkyl halide wherein each alkyl or aralkyl independently has 1 to 8 carbon atoms and the proton scavenger is 2,6-di-tert-butyl pyridine.

7. The process of claim 1 wherein the catalyst composition further comprises amine.

8. The process of claim 7, wherein the amine is represented by the formula:

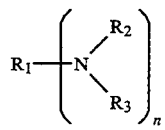

wherein $R_1$, $R_2$, and $R_3$ are each independently hydrogen or a straight, cyclic or branched chain alkyl aryl or aralkyl containing one to fifteen carbon atoms, and n is an integer, provided that only one of $R_1$, $R_2$ or $R_3$ can be H at any one time and that $R_2$ and $R_3$ can be joined in a cyclic structure.

9. The process of claim 1 wherein the initiator is represented by the formula:

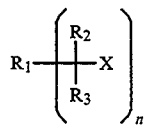

wherein $R_1$, $R_2$ and $R_3$ are independently $C_1$ to $C_{15}$ alkyl straight or branched chain alkyls, aryls or aralkyls, X is a halogen, ether, ester, carboxylic acid or acid halide group or a mixture thereof and n is a number from 1 to 6.

10. The process of claim 1 wherein the monomer is isobutylene.

11. The process of claim 1 wherein the monomers are isobutylene and para-methylstyrene.

12. A process for the polymerization of two or more different olefin, iso-olefin or di-substituted olefin monomers comprising contacting in a solvent medium under polymerization conditions said monomers with an:
   initiator of water, a tertiary alkyl or aralkyl halide, a tertiary alkyl or aralkyl ester, a tertiary alkyl or aralkyl ether, a tertiary alkyl or aralkyl carboxylic acid, or a tertiary alkyl or aralkyl acid halide, wherein each alkyl is independently a linear, branched or cyclic chain alkyl and each aralkyl may be substituted or unsubstituted; and
   a co-initiator of alkoxy metal halide, wherein the metal is selected from the group consisting of aluminum, boron, gallium, vanadium, chromium, manganese, iron, cobalt, nickel, copper, zinc, tin, indium;
   optionally a proton scavenger; and
   optionally an amine.

13. A process for the polymerization of one or more olefin, iso-olefin or di-substituted olefin monomers comprising contacting in a solvent medium under polymerization conditions said monomers with an:
   initiator of water, a co-initiator of alkoxy metal halide wherein the metal is selected from the group consisting of aluminum, boron, gallium, vanadium, chromium, manganese, iron, cobalt, nickel, copper, zinc, tin, indium; and, optionally, an amine.

14. A process for producing a polymer comprising contacting under polymerization conditions one or more olefinic, iso-olefinic, di-substituted olefinic or styrenic monomers with a catalyst composition comprising:
   an initiator represented by the formula:
   wherein $R_1$, $R_2$ and $R_3$ are independently $C_1$ to $C_{15}$ alkyl straight, cyclic or branched chain alkyls, aryls or aralkyls, X is a psuedohalogen or alcohol group or a mixture thereof and n is a number from 1 to 6; and
   a co-initiator of alkoxy metal halide or alkoxy metal pseudohalide, wherein each alkyl of the alkoxy is independently a straight or branched chain $C_1$ to $C_{15}$ alkyl and the metal is selected from the group consisting of aluminum, boron, gallium, vanadium, chromium, manganese, iron, cobalt, nickel, copper, zinc, tin, indium.

15. The process of claim 14 wherein the process is conducted in a solvent medium.

16. The process of claim 14 further comprising a proton scavenger.

* * * * *